3,291,771
MELT SPINNABLE POLYAMIDE DYED WITH
STABLE ANTHRAQUINONES
Hans Altermatt, Reinach, Basel-Land, Switzerland, assignor to Ciba Limited, Basel, Switzerland, a company of Switzerland
No Drawing. Filed Feb. 21, 1962, Ser. No. 174,724
Claims priority, application Switzerland, Feb. 23, 1961, 2,184/61
2 Claims. (Cl. 260—37)

The dyeing of linear polyamides in the melt requires dyestuffs having so high a stability that inorganic pigments have generally been used for this purpose. However, such pigments have a low coloring power. Moreover, the fibers colored therewith have rather dull tints. Attempts have therefore been made to use organic pigments whenever possible, rather than inorganic pigments. However, only very few organic dyestuffs are known which are stable to polyamide melts. Even the usual anthraquinone vat-dyestuffs are useless for this purpose, because they are reduced by the polyamide melt.

The present invention is based on the unexpected observation that anthraquinone dyestuffs of the formula (1) 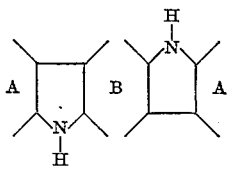

in which each A represents an anthraquinone radical, and B represents an at least bicyclic non-vattable aryl radical, are resistant to polyamide melts, and are especially suitable for dyeing spinnable polyamides in the melt.

As spinnable polyamides there may be used in the process of the invention, polyamides such as are obtained, for example, from ε-caprolactam (trade name "Perlon"), ω-amino-undecanic acid (trade name "Rilsan"), hexamethylene diamine and adipic acid (trade name "nylon") or analogous starting materials. There may also be used mixed polyamides, for example, of ε-caprolactam and hexamethylene diamine and adipic acid. The polyamides are advantageously used in a disintegrated form as so-called chippings.

The dyestuffs of the Formula 1 contain at least one bicyclic aryl radical B, for example, a naphthalene, anthracene, fluoranthene, pyrene or advantageously a crysene radical. As anthraquinone radicals A there may be mentioned, in addition to the simple anthraquinone radical and its substitution products, anthraquinone radicals which also contain fused-on carbocyclic or heterocyclic rings, such, for example, as the radicals of 1:2-benzanthraquinone of anthraquinone-isothiazole-anthrone or of anthrapyrimidine. Of special interest are dyestuffs of the formula (2) 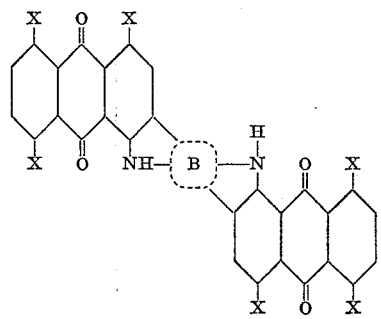

in which B represents a naphthalene or chrysene radical, and one X in each anthraquinone radical represents an acylamino group and the other X's represent hydrogen atoms. As acylamino groups there may be mentioned those of aliphatic monocarboxylic acids, for example, acetic acid, or of heterocyclic monocarboxylic acids, for example, pyridine monocarboxylic acid, and especially of aromatic monocarboxylic acids, for example, naphthalene monocarboxylic acids, and advantageously benzoic acid and substitution products thereof, for example, ortho-, meta- or para-chloro- or -methyl- or methoxy-benzoic acids. Such dyestuffs are known, and their manufacture is described, for example, in U.S. Patent No. 2,272,012 granted February 3, 1942 to Walter Kern et al. and in British Patent Nos. 498,602 and 522,657.

The polyamide to be dyed is "bread-crumbed" in the form of a powder, granules or chippings with the dry dyestuff powder, that is to say, the polyamide and dyestuff powder are mixed together mechanically in such manner that the particles of the polyamide are coated with a layer of the dyestuff powder. The dyestuff is advantageously present in a finely divided form. Especially good results are obtained by using a dyestuff preparation consisting of a fine powder of the material to be dyed which contains the dyestuff uniformly dispersed therein. Such preparations can be obtained, for example, in the manner described in Belgian specification No. 567,953 by dispersing a pigment in a solution of the polyamide in formic acid and precipitating the pigmented polyamide by the addition of water.

The "bread-crumbed" polyamide particles are then melted and spun in known manner or otherwise shaped, for example, formed into sheets. The polyamides can also be dyed by adding the dyestuff before, during or at the end of the polycondensation of the monomer. The colored material so obtained is then shaped, in the same way as an uncolored polyamide, alone or in admixture with another dyed or undyed material.

The polyamide melt, which has been dyed by the process of the invention, can be worked up into special structures, more especially spun into fibers. The dyed fibers so obtained are distinguished by their very attractive brown tints of good brilliance and having excellent fastness to light and excellent properties of wet fastness.

The following examples illustrate the invention, the parts and percentages being by weight:

*Example 1*

99 parts of a polyamide obtained from hexamethylene diamine and adipic acid are "bread-crumbed" in the dry state in the form of chippings with 1 part of dyestuff of the formula

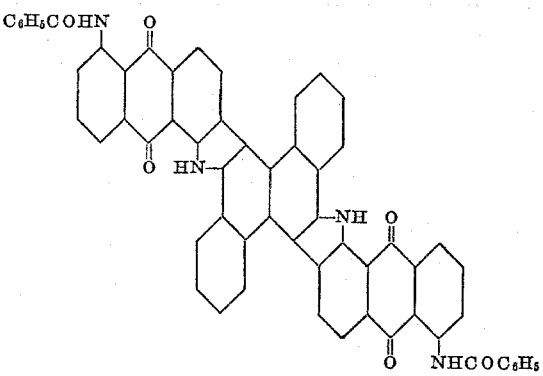

in a very fine state of division. The "bread-crumbed" chippings are spun in the usual manner, for example, by the grate spinning method, at about 290–295° C. The filaments so obtained have a deep brown tint, and the dyeing has an excellent fastness to light and excellent properties of wet fastness.

Instead of a polyamide obtained from hexamethylene diamine and adipic acid, there may be used with equal success a polyamide obtained from ε-caprolactam or aminoundecanic acid.

*Example 2*

The procedure is the same as described in Example 1, except that the dyestuff used is replaced by one of the dyestuffs given in column I of the following table. In this manner the polyamides mentioned in that example are dyed tints having excellent properties of fastness, the tints of the dyeings being given in column II.

| No. | I | II |
|---|---|---|
| 1 | [structure] | yellow-brown. |
| 2 | [structure] | red-brown. |

| No. | I | II |
|---|---|---|
| 3 | (structure: dibenzoylamino bis-anthraquinone linked via naphthalene carbazole) | yellow-brown. |
| 4 | (structure: dibenzoylamino bis-anthraquinone linked via naphthalene carbazole, isomer) | yellow-brown. |
| 5 | (structure: bis-acetylamino anthraquinone linked via chrysene carbazole) | yellow-brown. |

The dyestuffs used in the foregoing examples can be obtained by the process described in the afore-mentioned patents, column 2, lines 50–53, by condensing the appropriate monoacylated diamino-anthraquinone with the appropriate dibromo-naphthalene or 2:8-dibromochrysene followed by carbazolization in sulfuric acid of 96% strength at 0 to 5° C.

The compound No. 3 of the table may be prepared as described in Example 5 of British Patent No. 498,602 by condensation of 1 mol. of 1,4-dichloro-naphthalene with 2 mols. of 1-amino-5-benzoylaminoanthraquinone and carbazolizing the so obtained compound. The dyestuff No. 4 of the table may be prepared in an analogous manner by starting from 1,5-dichloro-naphthalene instead of 1,4-dichloro-naphthalene.

What is claimed is:
1. A spinnable polyamide of hexamethylene diamine and adipic acid having incorporated in finely divided form a dyestuff selected from the group consisting of the formulae

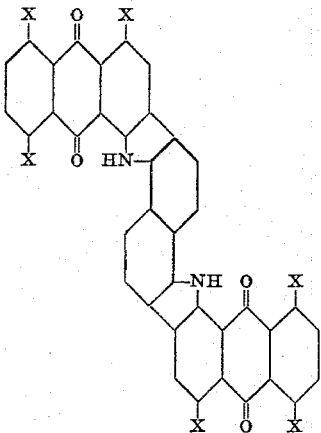

and

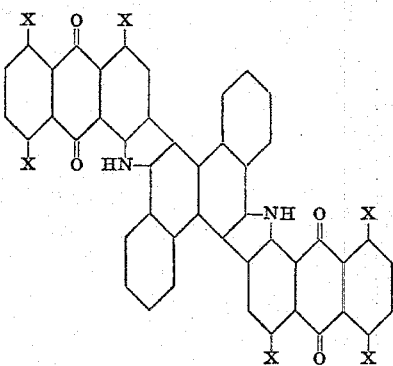

in which one X in each anthraquinone radical represents acylamino and the other X's represent hydrogen atoms.

2. A spinnable polyamide from hexamethylene diamine and adipic acid having incorporated in finely divided form the dyestuff of the formula

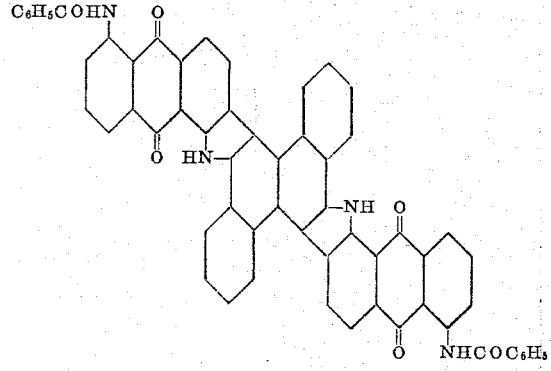

References Cited by the Examiner

UNITED STATES PATENTS

| | | | |
|---|---|---|---|
| 2,270,168 | 1/1942 | Mieg et al. | 260—316 |
| 2,272,012 | 2/1942 | Kern et al. | 260—316 |
| 2,345,533 | 3/1944 | Graves. | |
| 2,571,319 | 10/1951 | Water et al. | |
| 3,006,882 | 10/1961 | Altermatt et al. | |

FOREIGN PATENTS

| | | |
|---|---|---|
| 498,602 | 1/1939 | Great Britain. |
| 522,657 | 6/1940 | Great Britain. |
| 839,712 | 6/1960 | Great Britain. |

MORRIS LIEBMAN, *Primary Examiner.*

MILTON STERMAN, *Examiner.*

T. D. KERWIN, J. W. BEHRINGER, A. H. KOECKERT, *Assistant Examiners.*